(12) United States Patent
Sieber et al.

(10) Patent No.: US 9,051,957 B2
(45) Date of Patent: Jun. 9, 2015

(54) OIL RETAINING RING

(71) Applicant: Siemens Aktiengesellschaft, München (DE)

(72) Inventors: Dirk Sieber, Penig (DE); Thomas Steubler, Lugau/Erzgeb. (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 120 days.

(21) Appl. No.: 13/961,306

(22) Filed: Aug. 7, 2013

(65) Prior Publication Data

US 2015/0043996 A1 Feb. 12, 2015

(30) Foreign Application Priority Data

Aug. 8, 2012 (DE) .......................... 10 2012 214 060

(51) Int. Cl.
- *F16C 33/66* (2006.01)
- *F16B 21/06* (2006.01)
- *B23P 19/08* (2006.01)

(52) U.S. Cl.
CPC ............... *F16B 21/06* (2013.01); *B23P 19/084* (2013.01); *F16C 33/66* (2013.01)

(58) Field of Classification Search
CPC ...... F16C 33/66; F16C 33/6655; F16B 21/06; B23P 19/084
See application file for complete search history.

(56) References Cited

U.S. PATENT DOCUMENTS

| 1,207,759 | A | | 12/1916 | Huff |
|---|---|---|---|---|
| 4,575,265 | A | | 3/1986 | Tooley |
| 4,928,551 | A | * | 5/1990 | Connelly et al. ............... 384/473 |
| 5,560,619 | A | * | 10/1996 | Acree ........................... 384/403 |
| 6,474,444 | B1 | | 11/2002 | Mochizuki |
| 7,364,395 | B2 | * | 4/2008 | Grimmer et al. ............... 411/517 |
| 8,607,761 | B2 | * | 12/2013 | Nagahashi et al. ........... 384/400 |
| 2012/0129614 | A1 | | 5/2012 | Knoblauch et al. |
| 2013/0001358 | A1 | * | 1/2013 | Zeisler ........................... 384/462 |

FOREIGN PATENT DOCUMENTS

| DE | 3215823 A1 | 10/1983 |
|---|---|---|
| DE | 20317093 U1 | 2/2004 |
| DE | 102010052310 A1 | 5/2012 |
| EP | 0668450 A2 | 8/1995 |
| EP | 2574826 | 4/2013 |
| GB | 1260523 A | 1/1972 |

OTHER PUBLICATIONS

U.S. Appl. No. 55/520,468, filed May 28, 1996, Ishikawajima-Harima.

* cited by examiner

*Primary Examiner* — Thomas R. Hannon

(74) *Attorney, Agent, or Firm* — Henry M. Feiereisen LLC.

(57) ABSTRACT

An oil retaining ring for retaining oil in a bearing includes a holding ring in the form of a internal Seeger circlip ring, and a baffle which is placed on an inner periphery of the holding ring. The baffle includes an outer retaining wall and an inner retaining wall which is connected to the outer retaining wall along a groove which establishes a predetermined rupture joint.

11 Claims, 5 Drawing Sheets

OIL RETAINING RING

CROSS-REFERENCES TO RELATED APPLICATIONS

This application claims the priority of German Patent Application, Serial No. 10 2012 214 060.3, filed Aug. 8, 2012, pursuant to 35 U.S.C. 119(a)-(d), the content of which is incorporated herein by reference in its entirety as if fully set forth herein.

BACKGROUND OF THE INVENTION

The present invention relates to an oil retaining ring and to a machine having incorporated such an oil retaining ring.

The following discussion of related art is provided to assist the reader in understanding the advantages of the invention, and is not to be construed as an admission that this related art is prior art to this invention.

In the case of a labyrinth seal of a gear or motor shaft, it is necessary to ensure that a shaft bearing arranged in a bearing bore, which lies above of the oil level in the oil sump is sufficiently supplied with oil and/or is able to roll in the oil. For continuous lubrication, it is necessary to establish a retaining edge on the inner side of the bearing bore behind which the oil can be retained.

The use of retaining plates has been proposed to retain oil in a shaft bearing by forming a dam behind which oil is able to accumulate. Since a size of a gear mechanism or a motor can normally be operated with different shaft diameters, the level of the retaining edge has to be adapted to the respective shaft diameter. Therefore, it is necessary to keep available a series of retaining plates for the different shaft diameters for each size.

It would therefore be desirable and advantageous to provide an improved oil retaining ring to obviate prior art shortcomings.

SUMMARY OF THE INVENTION

According to one aspect of the present invention, an oil retaining ring for retaining oil in a bearing includes a holding ring in the form of a internal Seeger circlip ring; and a baffle placed on an inner periphery of the holding ring and including an outer retaining wall and an inner retaining wall connected to the outer retaining wall along a groove which establishes a predetermined rupture joint.

According to another advantageous feature of the present invention, the outer retaining wall can extend further radially outward than the inner retaining wall with respect to the center point of the holding ring.

Seeger circlip rings are defined in DIN 472. An internal Seeger circlip ring is a machine element in the form of an open spring washer that secures loosely mounted rings, hubs etc. in a bore against axial displacement. An internal Seeger circlip ring has inwardly pointing ring ends with bores or holes arranged therein. The tips of pliers can be introduced into the bores or holes. On installation, the ring ends are spread by the pliers such that the Seeger circlip ring is able to squeeze into a groove in a bore, a so-called bore groove.

The special design of the outer contour with at least two integrated retaining edges produces a shape that covers a plurality of different shaft diameters. The embodiment of the holding ring functioning as basic body as a Seeger circlip ring enables simple assembly with circlip pliers, in particular Seeger circlip pliers. The predetermined rupture joint makes adaptation to different shaft diameters simple. If the shaft diameter is, for example, larger due to a selected transmission ratio, prior to the assembly of the oil retaining ring, the non-required elements of the baffle are removed, i.e. one or more retaining walls. The easy-to-change shape of the oil retaining ring—key word: "two in one"—results in a significant reduction in the required variety of parts in the modular gearbox.

Advantageous embodiments and developments of the invention are disclosed in the dependent claims. The method according to the invention can also be developed in accordance with the dependent apparatus claims and vice versa.

According to another advantageous feature of the present invention, the baffle can be arranged in a region of the inner periphery in facing relationship to a ring opening of the holding ring. The alignment of the baffle with the main directions of orientation facilitates the defined placing of the oil retaining ring in a bore groove and hence the observance of a defined oil level in the bearing.

According to another advantageous feature of the present invention, the holding ring can have at least one region which extends in a straight line between a ring opening of the holding ring and the baffle. Flattening of the sides improves the ease of assembly of the oil retaining ring.

According to another advantageous feature of the present invention, a wedge can be arranged on an edge of the holding ring. This ensures that the ring can only be fitted in a predefined orientation in the bore groove. An unwanted twisting of the ring on the insertion of the ring in a bore groove is prevented by the wedge(s) acting as an anti-rotation element. Advantageously, a wedge is provided at both ends of the holding ring.

According to another advantageous feature of the present invention, the oil retaining ring can be made of plastic. This reduces the material costs and simplifies the production of the oil retaining ring, e.g. in a die-casting process. However, it is also possible for the oil retaining ring to be made of another oil-resistant material, e.g. of a metal.

According to another aspect of the present invention, a machine includes a bearing arranged in a bearing bore of the machine, and an oil retaining ring arranged in a bore groove of the bearing bore, the oil retaining ring including a holding ring in the form of a internal Seeger circlip ring, and a baffle placed on an inner periphery of the holding ring and including an outer retaining wall and an inner retaining wall connected to the outer retaining wall along a groove which establishes a predetermined rupture joint.

The term "machine" is hereby to be understood to include a gear or a motor, having a shaft or axle bearing arranged in a bearing bore, with the oil retaining ring being arranged in a bore groove of the bearing bore.

According to another advantageous feature of the present invention, the oil retaining ring can be placed in the bore groove on a side of the bearing facing a machine interior for retaining oil in the bearing.

According to still another aspect of the present invention, a method includes placing a baffle on an inner periphery of a holding ring in the form of a internal Seeger circlip ring to construct an oil retaining ring, and applying a Seeger circlip pliers in bores arranged at ring ends of the oil retaining ring to install or remove the oil retaining ring in a bore groove in a bearing bore of a machine for retaining oil in a bearing.

According to another advantageous feature of the present invention, one of an outer retaining wall and an inner retaining wall of the baffle can be removed along a groove which establishes a predetermined. The rupture joint therefore serves to adapt the oil retaining ring to different shaft diameters.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
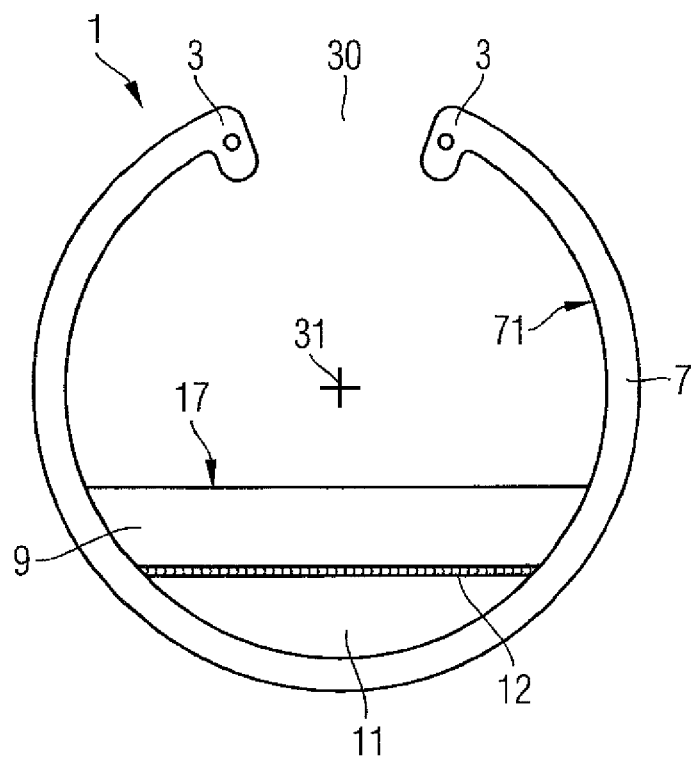
FIG. 1 is a basic configuration of an oil retaining ring according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a basic configuration of an oil retaining ring according to the present invention, generally designated by reference numeral 1. The oil retaining ring 1 includes a flat holding ring 7 in the form of an internal Seeger circlip ring, i.e. in the form of an open spring washer in the region of a ring opening 30 with inward pointing ring ends 3. The oil retaining ring 1 also has a baffle 17, which includes an inner retaining wall 9 and an outer retaining wall 11. The baffle 17 is arranged directly on the inner periphery 71 of the holding ring 7, advantageously in a region of the inner periphery 71, which lies opposite the ring opening 30 lying between the ring ends 3 with reference to the middle of the ring 31. The connection of the baffle 17 to the holding ring 7 is impervious to fluids.

It is also possible for the baffle 17 to include more than two retaining walls 9, 11. Here, each of the retaining walls 9, 11 can be detached from a retaining wall lying radially further outside so that the open inner surface of the holding ring 7 is enlarged. In order to facilitate the removal of a retaining wall 9, 11 in a defined manner, the baffle 17 has thinned material 12 functioning as a predetermined rupture joint at the contact point between two adjacent retaining walls 9, 11.

Figure 2:
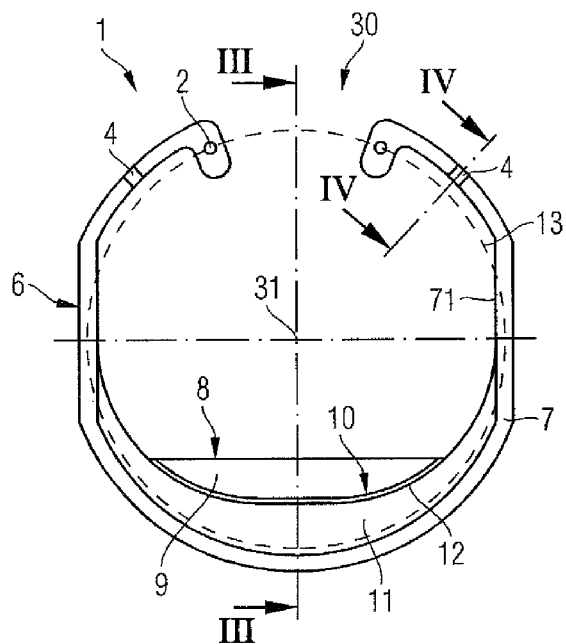
FIG. 2 is a representation of a currently preferred embodiment of an oil retaining ring according to the present invention.

FIG. 2 shows a representation of a currently preferred embodiment of an oil retaining ring 1 according to the present invention. Parts corresponding with those in FIG. 1 are denoted by identical reference numerals. The oil retaining ring 1 includes holding ring 7 in the form of a Seeger circlip ring. Holes 2 are formed in the ring ends 3 of the holding ring 7 bent toward the middle of the ring 31 e.g. by drilling. The axes of the bores 2 extend substantially parallel to the axis of the ring. The bores 2 lie on a base circle 13 specifying the course of the holding ring 7 in the ring half lying opposite the ring opening 30 of the open holding rings 7. Opposite to the ring opening 30 of the open holding rings 7, an outer retaining wall 11 is directly connected to the holding ring 7. With reference to the outer retaining wall further toward the middle of the ring 31, an inner retaining wall 9 is connected to the outer retaining wall 11.

When the oil retaining ring 1 is inserted into a bearing bore of a gear, the outer edge 8 of the inner retaining wall 9 facing the middle of the ring 31 serves as an upper oil retaining edge. When the oil retaining ring 1 is inserted into a bearing bore of a gear, the outer edge 10 of the outer retaining wall 11 facing the middle of the ring 31 serves as a lower oil retaining edge. Depending upon the desired oil level or shaft diameter, one or more retaining walls 9, 11 can be removed from the oil retaining ring 1, e.g. by knocking out the retaining wall 9, 11 manually or using a tool, e.g. pliers.

The holding ring 5 has flattened side surfaces 6. This facilitates the assembly of the oil retaining ring in a bearing bore.

Figure 3:
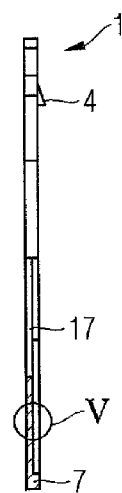
FIG. 3 is a representation of the oil retaining ring of FIG. 2, taken along the line III-III in FIG. 2.

FIG. 3 shows a section of the oil retaining ring 1 depicted in FIG. 2 taken along the section line III-III. It is evident that the baffle 17 is thinner than the holding ring 7. In the two regions of the holding ring 7 lying between the side surfaces 6 extending in a straight line and the ring ends 3, each flank of the holding ring 7 has a wedge-shaped thickening 4. This serves as an anti-rotation element; hence, the oil retaining ring 1 can only be inserted in one orientation in a bore groove.

Figure 4:
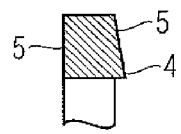
FIG. 4 is a partly sectional view of the oil retaining ring of FIG. 2, taken along the line IV-IV in FIG. 2.

FIG. 4 shows a section of the oil retaining ring 1 shown in FIG. 2, taken along the section line IV-IV. The section shows the wedge-shaped thickening 4, which is arranged on an edge 5 of the holding ring 7.

Figure 5:
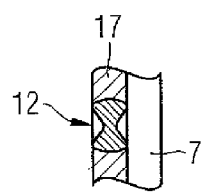
FIG. 5 is an enlarged cutaway of an area encircled in FIG. 3 and marked V.

FIG. 5 shows an enlargement of the area V marked in FIG. 3. The enlarged detail illustrates the reduced thickness of the retaining wall 17 in the region the rupture joint 12. The reduction in thickness is embodied in the form of a groove on each side of the retaining wall 17.

Figure 6:
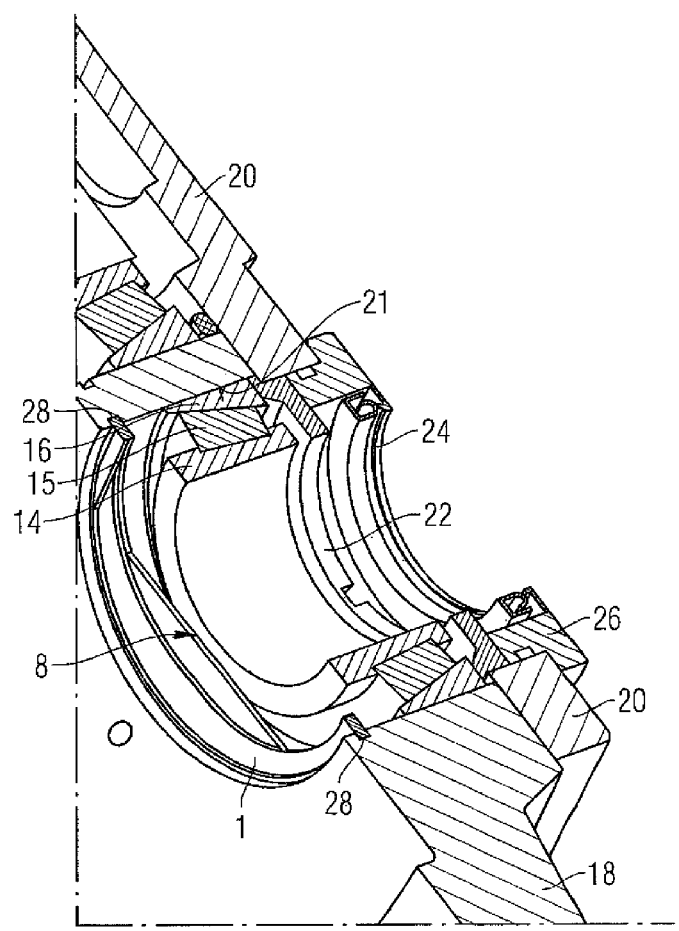
FIG. 6 is a sectional view of a shaft bearing in a gear, having incorporated an oil retaining ring according to the present invention.

FIG. 6 shows a section through a shaft bearing of a gear. A shaft bearing having a bearing outer ring 16, a bearing inner ring 14 and rollers 15 arranged there between is inserted in a bearing bore 21 in a gear housing 18. An oil retaining ring 1 according to the invention is inserted into a rectangular bore groove 28 on the side of the bearing facing the interior of the gear. A conventional outer oil retaining ring 22, e.g. a metallic oil retaining ring with at least one groove suitable for guiding oil, is arranged on the side of the bearing facing the exterior of the gear.

A bearing cover 20 is mounted on the outer side of the gear housing 18. A locating bushing 26 into which a labyrinth ring 24 is inserted is arranged in the bearing cover 20 and on the outer side of the outer oil retaining ring 22. The labyrinth ring 24 seals the annular gap around a shaft which is not shown in FIG. 6 so that the interior of the gear is sealed from the environment of the gear. This prevents oil from leaking from the gear.

Figure 7:
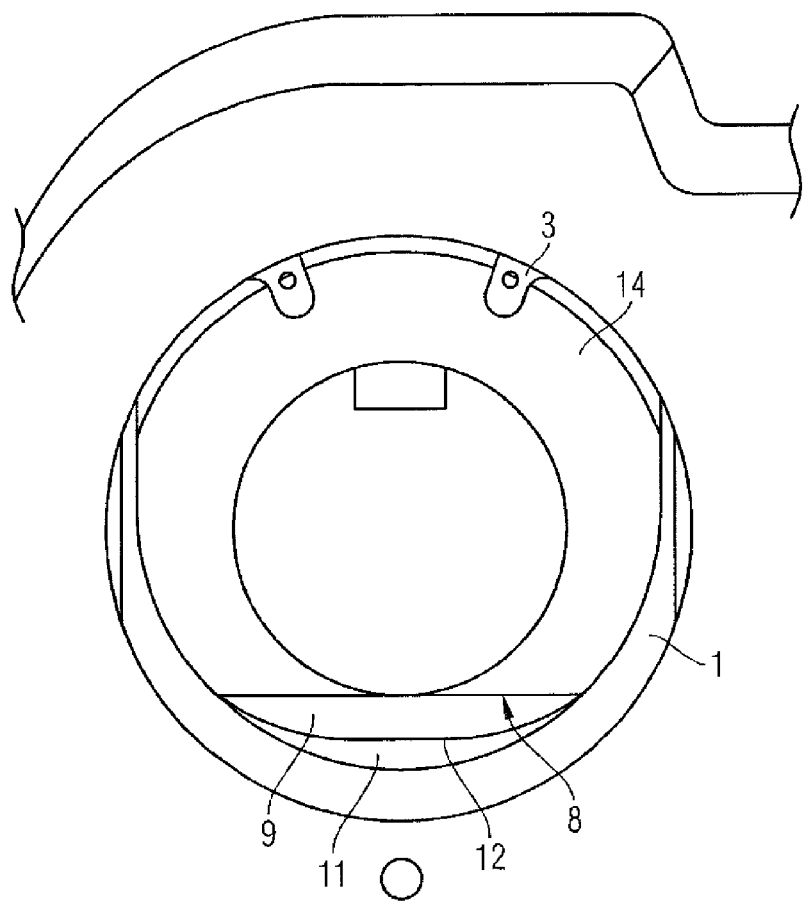
FIG. 7 is a representation of the oil retaining ring of FIG. 6 inserted in a bore groove for a first shaft diameter.

FIG. 7 shows a view of the oil retaining ring 1 shown in FIG. 6, which is adapted to a shaft with a first diameter, looking outward from the interior of the gear. The oil retaining ring 1 is inserted into a bore groove. The ring ends 3 with the bores used for the assembly protrude over the bearing inner ring 14 toward the axis of the bearing inner ring 14. Below the shaft (not shown) with a first diameter, which can be mounted in the bearing inner ring 14, the inner retaining edge 8 of the inner retaining wall can be identified which is connected to the outer retaining wall 11 of the baffle by means of a groove 12.

Figure 8:
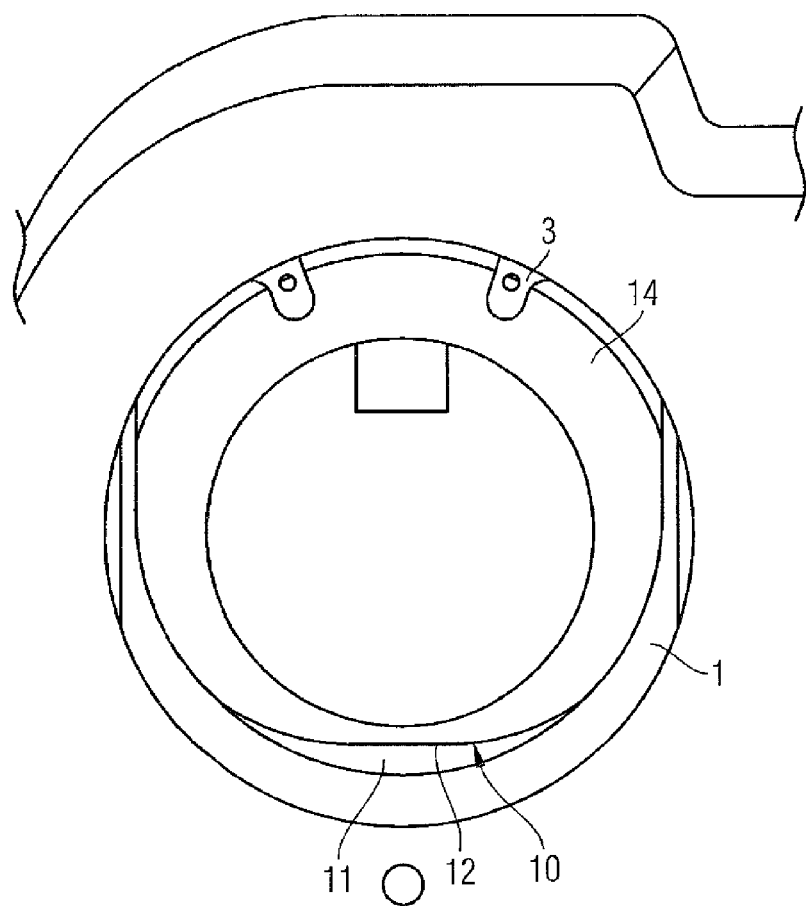
FIG. 8 is a representation of an oil retaining ring inserted in a bore groove for a second shaft diameter.

FIG. 8 shows a view of the oil retaining ring 1 shown in FIG. 6 looking outward from the interior of the gear for comparison with FIG. 7, wherein the oil retaining ring I is adapted to a shaft with a second diameter which is larger than the first diameter as shown in FIG. 7. For the adaptation to the larger shaft diameter, not only is a bearing inner ring 14 with a larger inner diameter inserted, but also the inner retaining wall of the baffle is removed from the oil retaining ring 1. In this way, the outer oil retaining edge 10, which is lower than the inner oil retaining edge 8 shown in FIG. 7, serves to retain oil.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An oil retaining ring for retaining oil in a bearing, said oil retaining ring comprising:
   a holding ring in the form of a internal Seeger circlip ring; and
   a baffle placed on an inner periphery of the holding ring and including an outer retaining wall and an inner retaining wall connected to the outer retaining wall along a groove which establishes a predetermined rupture joint.

2. The oil retaining ring of claim 1, wherein the holding ring defines a center point, said outer retaining wall extending further radially outward than the inner retaining wall in relation to the center point.

3. The oil retaining ring of claim 1, wherein the baffle is arranged in a region of the inner periphery in facing relationship to a ring opening of the holding ring.

4. The oil retaining ring of claim 1, wherein the holding ring has at least one region which extends in a straight line between a ring opening of the holding ring and the baffle.

5. The oil retaining ring of claim 1, further comprising a wedge arranged on an edge of the holding ring.

6. The oil retaining ring of claim 1, wherein the oil retaining ring is made of plastic.

7. A machine, comprising:
   a bearing arranged in a bearing bore of the machine; and
   an oil retaining ring arranged in a bore groove of the bearing bore, said oil retaining ring including a holding ring in the form of a internal Seeger circlip ring, and a baffle placed on an inner periphery of the holding ring and including an outer retaining wall and an inner retaining wall connected to the outer retaining wall along a groove which establishes a predetermined rupture joint.

8. The machine of claim 7, further comprising a bearing, said oil retaining ring placed in the bore groove on a side of the bearing facing a machine interior for retaining oil in the bearing.

9. The machine of claim 7, wherein one of the retaining walls is removable along the groove serving as the predetermined rupture joint.

10. A method, comprising:
    placing a baffle on an inner periphery of a holding ring in the form of a internal Seeger circlip ring to construct an oil retaining ring; and
    applying a Seeger circlip pliers in bores arranged at ring ends of the oil retaining ring to install or remove the oil retaining ring in a bore groove in a bearing bore of a machine for retaining oil in a bearing.

11. The method of claim 10, further comprising removing one of an outer retaining wall and an inner retaining wall of the baffle along a groove which establishes a predetermined rupture joint.

\* \* \* \* \*